(12) United States Patent
Kojima et al.

(10) Patent No.: US 8,609,186 B2
(45) Date of Patent: Dec. 17, 2013

(54) METHOD FOR MANUFACTURING COATING FILM

(75) Inventors: Norichika Kojima, Minami-Ashigara (JP); Hidetomo Itoh, Minami-Ashigara (JP); Makoto Sato, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 379 days.

(21) Appl. No.: 12/959,720

(22) Filed: Dec. 3, 2010

(65) Prior Publication Data

US 2011/0135828 A1 Jun. 9, 2011

(30) Foreign Application Priority Data

Dec. 3, 2009 (JP) .................. 2009-275816

(51) Int. Cl.
- *B05D 3/12* (2006.01)
- *B21F 9/00* (2006.01)
- *D06C 3/00* (2006.01)
- *B05D 3/02* (2006.01)
- *H05B 6/02* (2006.01)
- *H05B 3/00* (2006.01)

(52) U.S. Cl.
USPC ............ 427/171; 427/172; 427/316; 427/322; 427/543; 427/545

(58) Field of Classification Search
USPC ......... 427/171, 172, 209, 226, 227, 299, 314, 427/316, 322, 541, 543, 544, 545
See application file for complete search history.

(56) References Cited

U.S. PATENT DOCUMENTS

| | | | |
|---|---|---|---|
| 6,125,754 A * | 10/2000 | Harris ........................ | 101/420 |
| 7,381,931 B2 | 6/2008 | Hayashi et al. | |
| 7,541,560 B2 | 6/2009 | Hayashi et al. | |
| 2006/0275611 A1 | 12/2006 | Nishimura | |
| 2007/0048457 A1 * | 3/2007 | Ando et al. ................ | 428/1.1 |
| 2007/0146887 A1 | 6/2007 | Ikeda et al. | |
| 2009/0272005 A1 | 11/2009 | Hayashi et al. | |

FOREIGN PATENT DOCUMENTS

| | | |
|---|---|---|
| JP | 9-145903 | 6/1997 |
| JP | 2003-311911 | 11/2003 |
| JP | 2004-066122 | 3/2004 |
| JP | 2004-205091 | 7/2004 |
| JP | 2005-257786 | 9/2005 |
| JP | 2005-279449 | 10/2005 |
| JP | 2005279449 A * | 10/2005 |
| JP | 2006-334561 | 12/2006 |

* cited by examiner

*Primary Examiner* — Michael Wieczorek
(74) *Attorney, Agent, or Firm* — Young & Thompson

(57) ABSTRACT

The presently disclosed subject matter provides a method for manufacturing a coating film whereby a problem of planarity in a plastic film wound up into a roll form can be eliminated and the coating film can be formed uniformly and precisely. There is therefore provided a method for manufacturing a coating film in which a plastic film wound into a roll form is wound off to be allowed to run and is fed while winding the film around a heat roller so as to eliminate deformations in the plastic film, and then a coating liquid is applied onto the plastic film, wherein in a position where wrinkles begin to form in the plastic film due to heating by the heat roller, the plastic film is pneumatically pressed by air jetted from an air nozzle at a pressure equal to or higher than a pressure at which the wrinkles disappear.

12 Claims, 6 Drawing Sheets

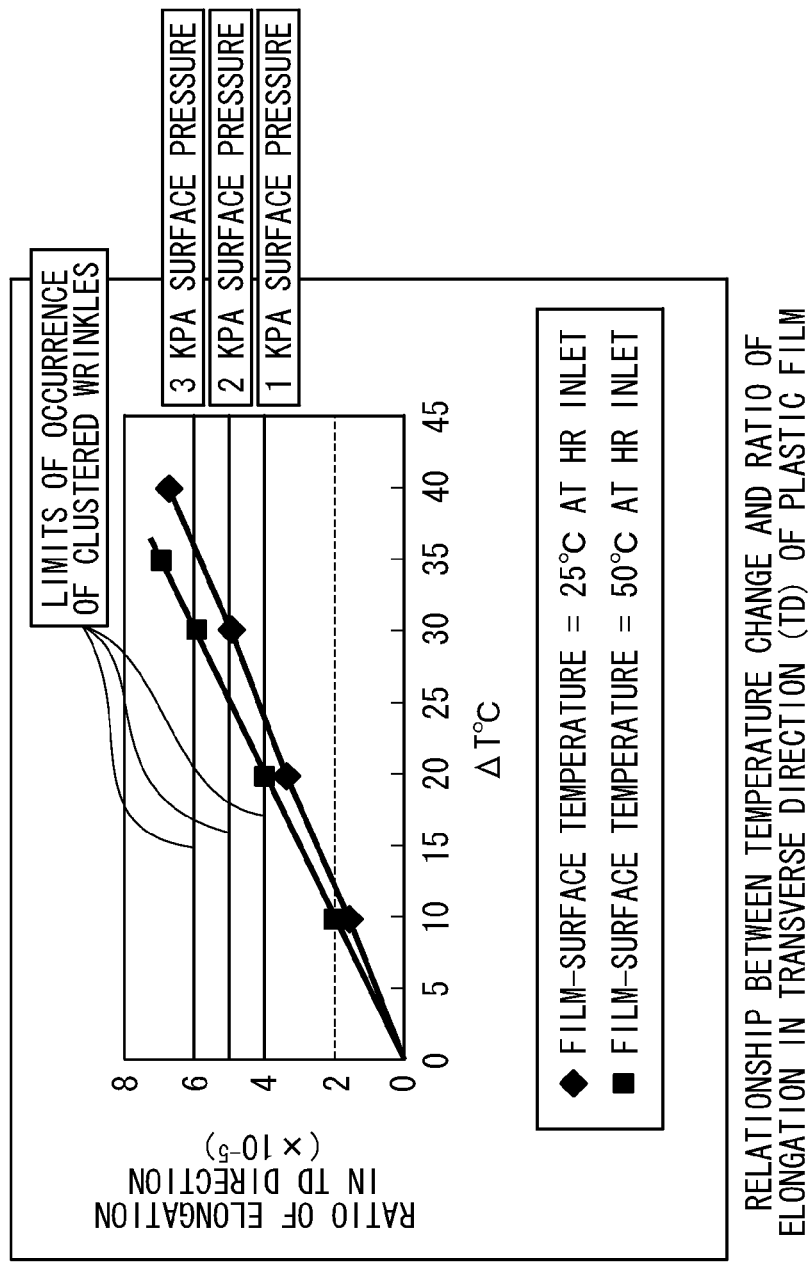

METHOD FOR MANUFACTURING COATING FILM

BACKGROUND OF THE INVENTION

1. Field of the Invention

The presently disclosed subject matter relates to a method for manufacturing a coating film. More particularly, the presently disclosed subject matter relates to a method for manufacturing a coating film in which a coating layer is provided by applying a coating liquid to a travelling plastic film.

2. Description of the Related Art

In a flat panel display (FPD), including a cathode-ray tube display (CRT), a plasma display panel (PDP), an electroluminescent display (ELD) and a liquid crystal display (LCD), an optical functional film (coating film), such as an antireflection film, an antiglare film or a surface protection film, is used for the outermost layer of the flat panel display, in order to enhance visibility and improve abrasion resistance.

The abovementioned optical functional films are frequently and directly exposed to human visual observation. In addition, there has recently been a significant increase in the screen size, brightness and definition of displays. Consequently, an optical functional film to be used is stringently required to have appearance quality (absence of point defects, uneven coating, contamination, and the like) and quality in terms of physical durability (superiority in abrasion resistance, stainproofness, and the like).

In particular, abrasion resistance is crucial for an antireflection film since if a display surface becomes scratched, the scratch leads to a permanent display defect, thus causing the appearance quality of a display unit to degrade significantly.

The optical functional layer of the antireflection film is generally formed by repeating a process of coating a solution of a material for forming functional materials containing an organic solvent onto a base film and drying the solution a plurality of times. In the course of manufacturing an optical film in which the optical functional layer is provided by such a coating process as described above, an appearance failure (unevenness failure, in particular) is liable to occur due to irregularity in the coating liquid immediately after coating or irregularity in the coating thickness of the optical functional layer caused by nonuniform drying.

Accordingly, in order to improve coating properties, uniformize drying and impart high-speed coatability, there has been proposed a method for adding an additive, such as a fluorine-based compound or a silicone-based compound having an interfacial activation effect, into the coating liquid (see Japanese Patent Application Laid-Open No. 2005-257786). In addition, a method has been carried out in which drying speed at the time of initial drying is controlled and contactless feed is performed. (See Japanese Patent Application Laid-Open No. 2006-334561).

On the other hand, as a method for imparting abrasion resistance, there is known a method in which a coating liquid composed primarily of an ionizing radiation-cured resin composite including fine particles is coated and hardened using ultraviolet rays, electron beams or heat, when forming a low-refractive index layer to be located on the outermost surface (Japanese Patent Application Laid-Open No. 9-145903). In addition, the antireflection film is formed by laminating a plurality of optical functional layers and physical functional layers. Hence, reactive functional groups in the hardening resin of a layer to be coated are brought into a half-cured state, in order to improve interlayer adhesion (Japanese Patent Application Laid-Open No. 2003-311911).

SUMMARY OF THE INVENTION

The planarity of a plastic film wound into a roll form becomes an issue when a coating liquid is applied to a plastic film in order to manufacture a coating film. Thus, there has been the problem that it is difficult to uniformly and precisely form the coating film on the plastic film. In particular, if the coating film is an optical functional film, such as an antireflection film, in which an optical functional layer is provided, a coating film needs to be formed thinly and precisely. In addition, a thin film is frequently used as the plastic film. Consequently, the problem of planarity in the plastic film prior to coating is significant.

The presently disclosed subject matter has been accomplished in view of such circumstances as described above. Therefore, the presently disclosed subject matter aims to provide a method for manufacturing a coating film whereby a problem of planarity in a plastic film wound up into a roll form can be eliminated and the coating film can be formed uniformly and precisely.

In order to achieve the aforementioned object, there is provided a for manufacturing a coating film, comprising: winding off a plastic film wound into a roll form to run; conveying the plastic film while winding the plastic film around a heat roller; pneumatically pressing by air jetted from an air nozzle at a pressure equal to or higher than a pressure at which wrinkles disappear in a position where the wrinkles begin to form in the plastic film due to heating by the heat roller; and applying the coating liquid onto the plastic film after the pneumatic press.

The inventors of the present application have conceived an idea of correcting deformation in the plastic film on the upstream side of a coating position in order to reduce a coating irregularity defect arising from the deformation (corrugated plate-like wrinkles) of the plastic film. To do so, the plastic film is fed while winding the plastic film around the heat roller. This method is intended to enable the planarity of the plastic film to be secured at the coating position by the heat treatment effect (ironing effect) of the heat roller.

It has proved, however, that use of the heat roller causes wrinkles to occur in clusters in the plastic film on the heat roller. The reason for these wrinkles is that marginal plastic deformations are caused in the plastic film due to heating by the heat roller. This problem causes the coating irregularity of the coating liquid to become actualized and the plastic film to deteriorate in quality. That is, the plastic film is stretched in the transverse direction thereof on the heat roller due to thermal expansion. Thus, portions of the plastic film having stretched inwards across the width thereof form into wrinkles in clusters.

Hence, the inventors of the present application have conceived of pneumatically pressing the plastic film by air jetted from an air nozzle at an intensity of pressure equal to or higher than a pressure at which the wrinkles disappear, in a position where wrinkles begin to form in the plastic film due to heating by the heat roller. That is, the inventors have conceived of raising a surface pressure of the plastic film on the heat roller by the jetted air to crush the wrinkles, thereby stretching thermally-expanded portions of the plastic film outward across the width thereof.

In some cases, clusters of wrinkles may once again occur even if the clusters of wrinkles are crushed once by raising the surface pressure by pneumatic press, if the plastic film is heated on the heat roller. Accordingly, it is preferable to dispose a plurality of air nozzles under the conditions in which clusters of wrinkles are liable to occur.

According to the presently disclosed subject matter, it is possible to eliminate the planarity problem of a plastic film and uniformly and precisely form a coating film.

In the presently disclosed subject matter, it is preferable to optimally determine the position of pneumatic press by the air nozzle from conveyance rate of the plastic film, a roll diameter of the heat roller, a temperature of the heat roller, a film-surface temperature of the plastic film prior to contact with the heat roller, and a thickness of the plastic film.

By optimally determining the position of the air nozzle from the conveyance rate of the plastic film, the roll diameter of the heat roller, the temperature of the heat roller, the film-surface temperature of the plastic film prior to contact with the heat roller, and the thickness of the plastic film, it is possible to optimally apply pneumatic press to a position where wrinkles begin to occur due to heating by the heat roller.

In the presently disclosed subject matter, the heat roller may be structured so that both side edges (knurls) of the film do not come into contact with (touch with) surfaces of the heat roller.

In addition, in the presently disclosed subject matter, the heat roller may have a crown-like shape or surfaces of the heat roller immediately below both side edges (knurls) of the film may be concave.

The reason for this is that it is possible to prevent an expanded plastic film from failing to escape to the outside and, therefore, becoming wrinkled as the result of the knurls being caught on surfaces of the heat roller.

In addition, in the presently disclosed subject matter, a surface of the heat roller or contact surfaces of both side edges (knurls) of the film may be subjected to a friction-reducing treatment. By subjecting these surfaces to the friction-reducing treatment, the plastic film is allowed to stretch crosswise (in the transverse direction) even if the film expands. Consequently, wrinkles are less likely to develop in the plastic film. Here, possible examples of the friction-reducing treatment include coating surfaces of the heat roller with a fluorine resin, a silicone resin, or the like.

In the presently disclosed subject matter, at least one of rollers before and after the heat roller may be one of a concave roller and an expander roller.

In addition, in the presently disclosed subject matter, side edges of the plastic film may be pulled crosswise by using a tenter in at least one of positions in front and back of the heat roller.

By applying the above-described construction in at least one of positions in front and back of the heat roller, the strength of pulling the plastic film can be increased. Consequently, wrinkles are less likely to develop in the plastic film.

In the presently disclosed subject matter, grooves may be formed in surfaces of the heat roller.

By releasing carrier air through the grooves and thereby suppressing the lift of the plastic film on the heat roller, it is possible to suppress wrinkles resulting from feeding. Thus, it is possible to restrain wrinkles due to the thermal expansion of the plastic film from being enhanced by the wrinkles resulting from feeding.

In addition, in the presently disclosed subject matter, the plastic film is preferably a cellulose acylate film whose thickness is 80 μm or less.

The planarity problem of the plastic film is particularly significant in the case of a cellulose acylate film of 80 μm or less in thickness. In addition, clusters of wrinkles are liable to be developed by the heat roller. Accordingly, the presently disclosed subject matter is particularly effective for the cellulose acylate film.

According to the presently disclosed subject matter, it is possible to eliminate the planarity problem of a plastic film wound into a roll form and uniformly and precisely form a coating film.

BRIEF DESCRIPTION OF THE DRAWINGS

FIG. 4 is a graph illustrating a relationship between the temperature change and the ratio of elongation of a plastic (TAC) film;

DETAILED DESCRIPTION OF THE PREFERRED EMBODIMENTS

Hereinafter, preferred embodiments of the presently disclosed subject matter will be described according to the accompanying drawings. Although the presently disclosed subject matter is described by way of the preferred embodiments to be described hereinafter, the presently disclosed subject matter may be modified by using various techniques without departing from the scope of the presently disclosed subject matter and, therefore, embodiments other than the embodiments described herein can be utilized. Accordingly, it is to be understood that all modifications made within the scope of the presently disclosed subject matter are included in the appended claims. In addition, in the present specification, numeric ranges represented by using "to" refer to ranges inclusive of numeric values mentioned before and after "to".

Note that in the present embodiment, a description will be given assuming that a coating film is an antireflection film. However, the description also holds true for other optical functional films in which a coating layer is, in particular, a thin film.

Figure 1:
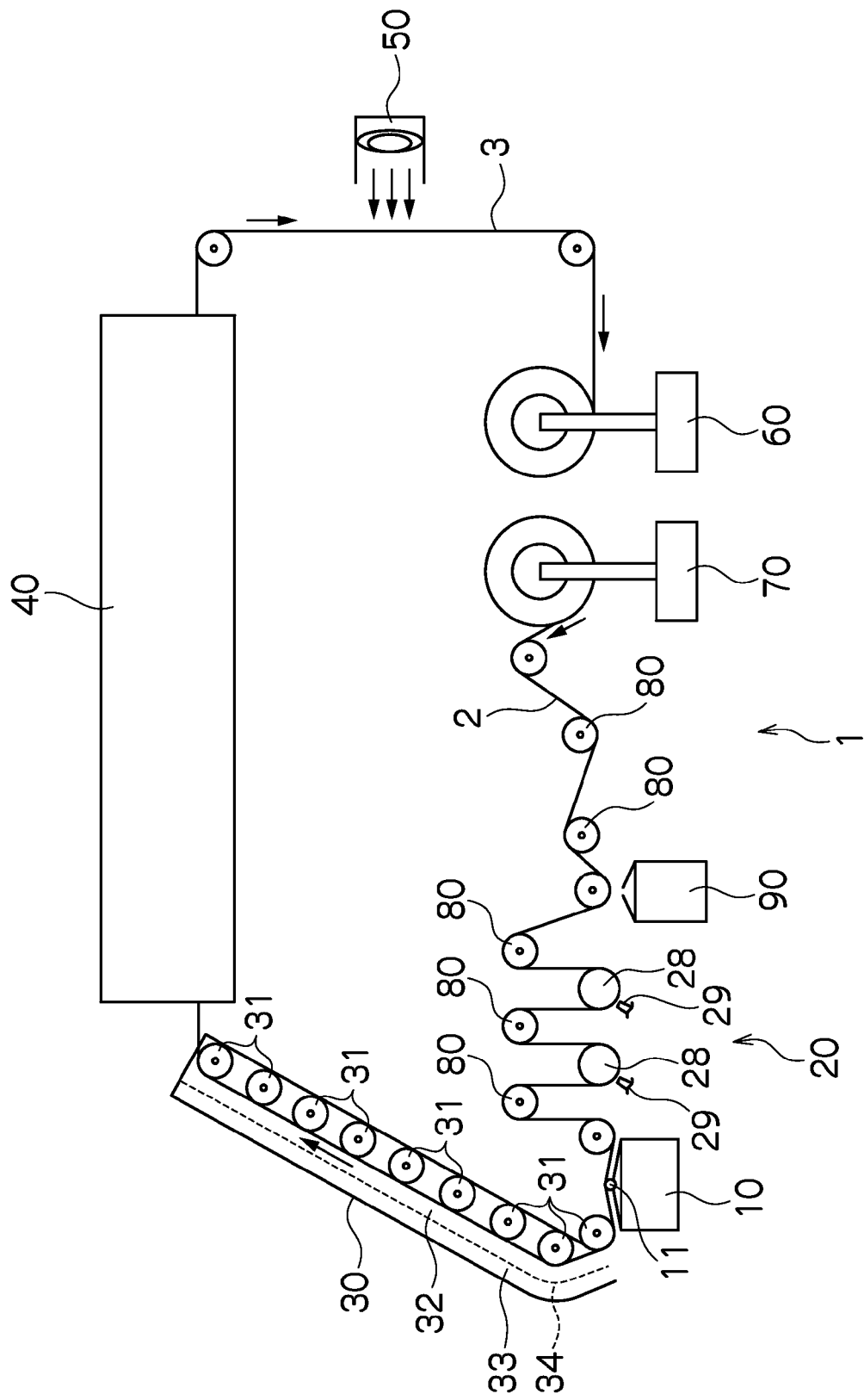
FIG. 1 is a schematic view illustrating an apparatus for manufacturing a coating film according to an embodiment of the presently disclosed subject matter.

FIG. 1 is a schematic view illustrating one example of the present embodiment. A coating film manufacturing apparatus 1 illustrated in FIG. 1 includes: a feeder 70 for feeding a base of an antireflection film to be formed, i.e., a plastic film (hereinafter referred to as a base film); a coating apparatus 10 for coating a liquid on a surface of a base film 2 to form a coating layer; a drying apparatus 30 including a plurality of path rollers 31 in order to dry the coating layer; a heating apparatus 40 for thermally hardening the coating layer; an ultraviolet lamp 50 for irradiating ultraviolet rays to the coating layer to fully facilitate hardening, thereby forming an antireflection film 3; and a take-up machine 60 for taking up the antireflection film 3. In addition to these components, the film manufacturing apparatus 1 includes a plurality of feed rollers 80 and a dust-removing apparatus 90.

The coating apparatus 10 includes a microgravure roller 11 on which a gravure pattern is stamped and a tank containing a coating liquid (not illustrated) below a feed passage of the base film 2. This microgravure roller 11 is a member used to coat the coating liquid on a desired surface of the base film 2. The abovementioned tank is disposed in a position below the microgravure roller 11, so that a surface of the microgravure roller 11 has contact with the coating liquid. Accordingly, the coating liquid can be supplied to the gravure pattern by bringing the coating liquid within the tank into contact with the surface of the microgravure roller 11. Here, extra mounts of coating liquid are removed by a doctor blade (not illustrated). Thus, it is possible to regulate the coating liquid to be supplied to the gravure pattern to an adequate amount.

The drying apparatus 30 includes a feed chamber 32 and an exhaust chamber 33 divided off by an air-regulating plate 34. The air-regulating plate 34 is a metal plate provided with a plurality of openings. Thus, the air-regulating plate 34 provides excellent ventilation between the feed chamber 32 and the exhaust chamber 33 while diving off the two chambers. The opening ratio, material and the like of the air-regulating plate 34 is not limited in particular. However, the air-regulating plate 34 is preferably a woven metal wire or a punched metal plate having an opening ratio of 50% or less, and more preferably 20 to 40%. In the present embodiment, a 300-mesh woven metal wire having an opening ratio of 30% is used. Note that the air-regulating plate 34 is preferably arranged so that a spacing between the air-regulating plate 34 and a surface of the coating layer of the base film 2 is approximately 10 mm.

The feed chamber 32 includes a plurality of path rollers 31 for feeding the base film 2 while supporting the film. Note that each path roller 31 is preferably detachable and attachable and is preferably adapted to enable easy detachment and attachment. For example, assume that the amount of residual solvent of a liquid coated on the base film 2 is 20% or larger but not larger than 45%. Then, it is possible to feed the base film 2 without deteriorating planarity by removing the path rollers 31 to contactles sly feed the base film 2.

An exhaust pipe for exhausting air within the exhaust chamber 33 and an air supply pipe for feeding fresh air into the exhaust chamber 33 (both are not illustrated) are attached to the exhaust chamber 33 in the transverse direction of the base film 2 and in positions opposite each other. Air within the exhaust chamber 33 is exhausted out of the chamber by the exhaust pipe and dry air heated to a desired temperature is fed into the exhaust chamber 33 by the air supply pipe. Thus, the internal temperature of the exhaust chamber 33 is adjusted as appropriate. Consequently, it is possible to facilitate the drying of a coating layer on the base film 2 fed through the feed chamber 32. Note that a gas supplied from the air supply pipe is not limited in particular, but may be a gas other than air.

In the heating apparatus 40, the coating layer dried by the drying apparatus 30 to remove a solvent therefrom is further heated and thereby thermally hardened. A temperature control device (not illustrated) for adjusting the temperature of chambers is disposed within the heating apparatus 40.

Here, if a coating film is manufactured using such a coating film manufacturing apparatus 1 as described above, the planarity of a plastic film becomes an issue. Accordingly, the manufacturing apparatus 1 has had the problem that it is difficult to uniformly and precisely form a coating film on the plastic film.

Hence, as illustrated in FIG. 1, a planarity-improving part 20 for the plastic film 2 is disposed on the upstream side of the coating apparatus 10 to correct the deformation of the plastic film.

Figure 2A:
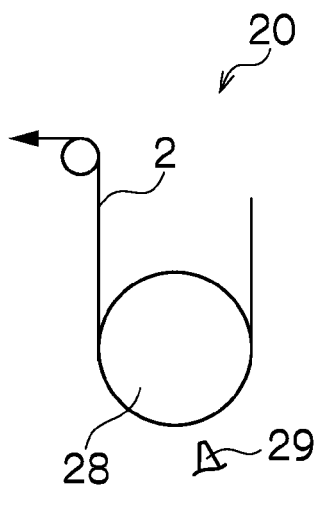
FIG. 2 is a schematic view of a planarity-improving part according to the presently disclosed subject matter.
Figure 2B:
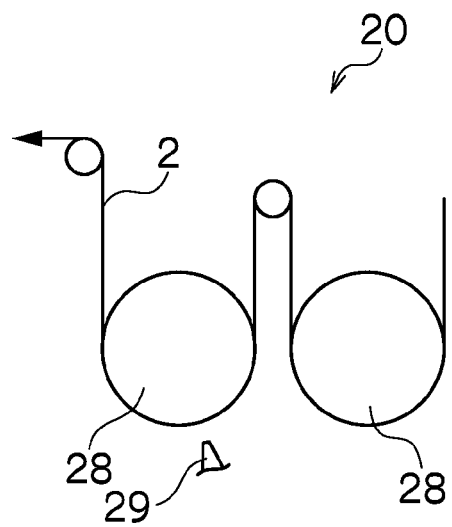

As illustrated in FIGS. 1 and 2, the plastic film 2 is fed while being wound around heat rollers 28. Consequently, it is possible to correct the deformation of the plastic film. Note that the number of heat rollers is not limited to two, like an example illustrated in FIG. 1. Alternatively, the number of heat rollers may be one, as illustrated in FIG. 2A, or may be two or more. Note here that the temperature of the heat rollers is preferably 50 to 80° C.

However, use of heat rollers causes wrinkles to occur in clusters in the plastic film on a heat roller. These wrinkles result from the marginal plastic deformation of the plastic film due to heating by the heat roller. That is, the plastic film stretches in the transverse direction thereof on the heat roller due to thermal expansion. Thus, portions of the plastic film having stretched inwards across the width thereof form into wrinkles in clusters. These wrinkles cause the coating irregularity of a coating liquid to become actualized and the plastic film to deteriorate in quality.

Hence, the inventors of the present application have conceived of pneumatically pressing the plastic film by air jetted from an air nozzle at an intensity of pressure equal to or higher than a pressure at which the wrinkles disappear, in a position where the formation of wrinkles begins in the plastic film due to heating by the heat roller. That is, the inventors have conceived of raising the surface pressure of the plastic film on the heat roller by the jetted air to crush the wrinkles, thereby stretching thermally-expanded portions of the plastic film outward across the width thereof.

As illustrated in FIG. 2, air nozzles 29 are provided in the vicinity of the heat rollers 28 of the planarity-improving part 20. Air is jetted from these air nozzles 29, and the plastic film 2 is pneumatically pressed against the heat rollers 28 by the pressure of the air. The pressure of pneumatic press is preferably set so as to be 2 to 50 kPa in combination with a tensile force applied to the plastic film on the heat rollers 28.

Figure 3A:
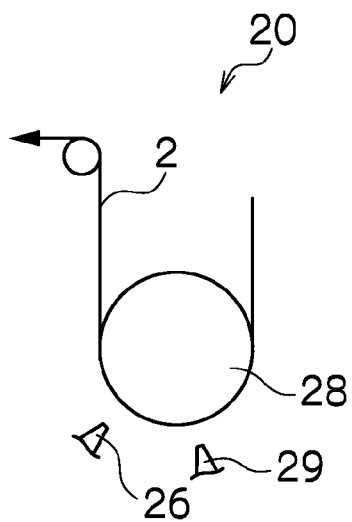
FIG. 3 is another schematic view of a planarity-improving part according to the presently disclosed subject matter.
Figure 3B:
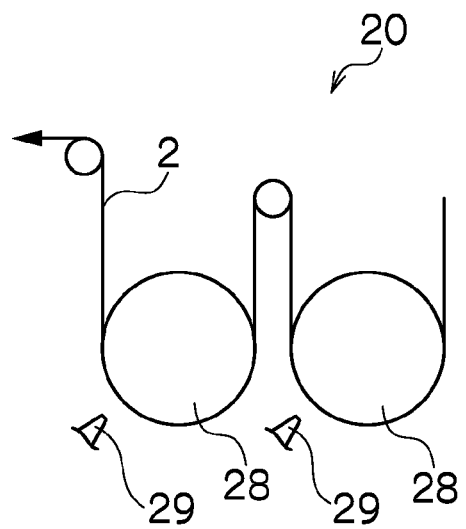

In some cases, pneumatic press may be applied in a plurality of places, as illustrated in FIG. 3. This is because even if wrinkles are crushed once by means of pneumatic press, the plastic film may once again thermally expand due to the heat of the heat rollers, thus causing wrinkles to develop again. Air needs to be applied to at least a place where clusters of wrinkles occur on each heat roller. The plastic film may, in some cases, once again thermally expand due to the heat of the heat rollers, thus causing wrinkles to develop again. Accordingly, air is preferably applied between a place where clusters of wrinkles occur and a place where the plastic film is released from being wound around the heat rollers.

Note that as illustrated in FIG. 4, the ratio of elongation of the plastic film depends on the rate of thermal expansion and the temperature change $\Delta T$ of the plastic film. For example, if an 80 μm-thick TAC (Triacetylcelluloce) film is used under the condition of a surface pressure on a heat roller being 1 kPa, then a cluster of wrinkles occurs at a ratio of elongation of $4 \times 10^{-5}$ or higher ($\Delta T$ is equivalent to 20° C.). Consequently, the TAC film can be used at $\Delta T$ of 25° C. or higher by setting the surface pressure to 2 kPa by means of pneumatic press, or at $\Delta T$ of 30° C. or higher by setting the surface pressure to 3 kPa or higher.

Accordingly, it is preferable to determine the optimum position of pneumatic press by the air nozzle from the feed rate of the plastic film, the roll diameter of the heat roller, the temperature of the heat roller, the film-surface temperature of the plastic film prior to contact with the heat roller, and the thickness of the plastic film.

FIGS. 5A to 5E are graphs illustrating preferred positions of pneumatic press by an air nozzle or nozzles. Here, each position of pneumatic press (position of air blow) is shown by defining a point at which the plastic film has contact with the heat roller as 0°.

Figure 5A:
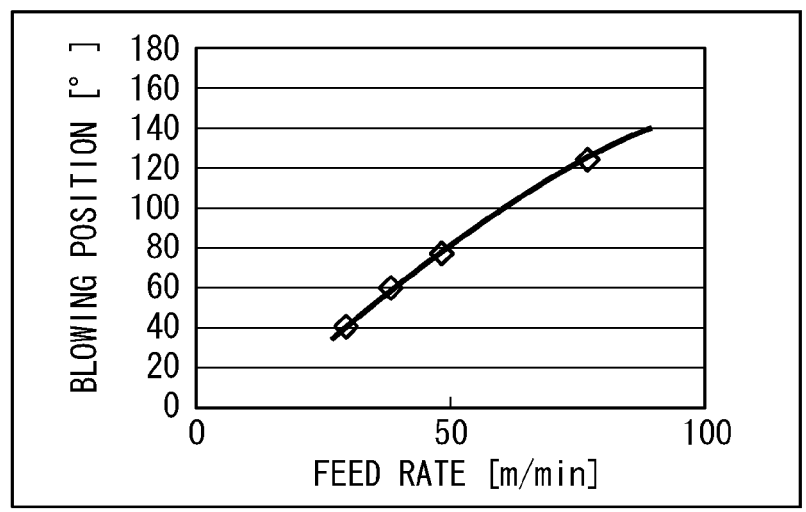
FIGS. 5A to 5E are graphs illustrating preferred positions of air blow.

In FIG. 5A, the roll diameter of the heat roller was set to φ300 mm, the temperature of the heat roller was set to 80° C., the film-surface temperature of the plastic film prior to contact with the heat roller was set to 55° C., and the thickness of the plastic film was set to 80 μm. In addition, pneumatic press was applied so that the surface pressure (pneumatic-press pressure+tension) of the plastic film was 3.0 kPa. The feed rate of the plastic film was varied to determine the optimum position of pneumatic press.

Figure 5B:
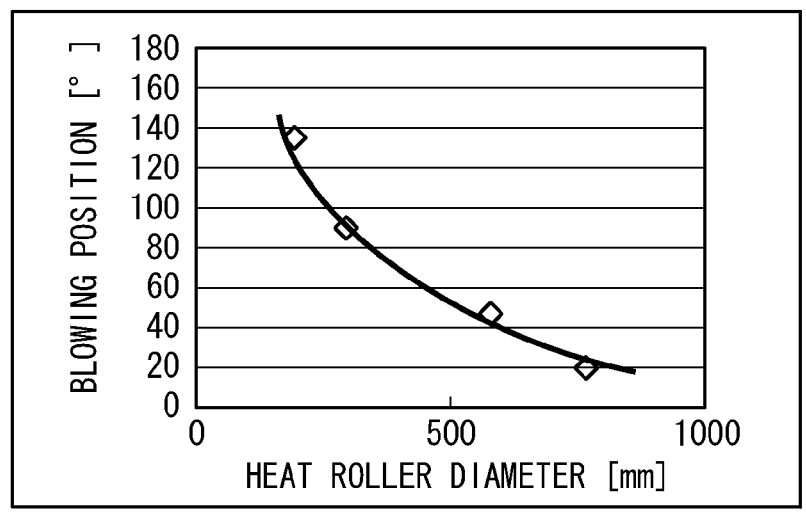

In FIG. 5B, the feed rate of the plastic film was set to 50 m/min, the temperature of the heat roller was set to 80° C., the film-surface temperature of the plastic film prior to contact with the heat roller was set to 55° C., and the thickness of the plastic film was set to 80 μm. In addition, pneumatic press was applied so that the surface pressure (pneumatic-press pressure+tension) of the plastic film was 3.0 kPa. The roll diameter of the heat roller was varied to determine the optimum position of pneumatic press.

Figure 5C:
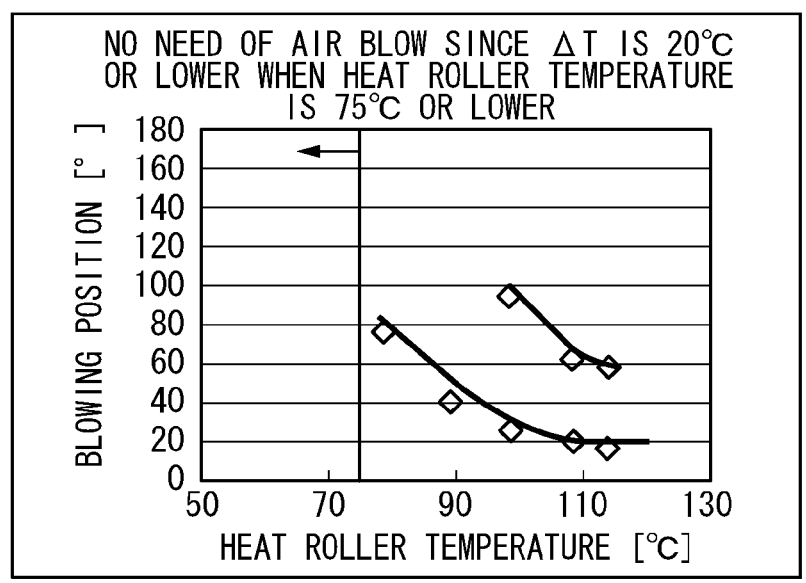

In FIG. 5C, the feed rate of the plastic film was set to 50 m/min, the roll diameter of the heat roller was set to φ300 mm, the film-surface temperature of the plastic film prior to contact with the heat roller was set to 55° C., and the thickness of the plastic film was set to 80 μm. In addition, pneumatic press was applied so that the surface pressure (pneumatic-press pressure+tension) of the plastic film was 3.0 kPa. The temperature of the heat roller was varied to determine the optimum position of pneumatic press. Note, however, that raising the temperature of the heat roller resulted in the need to apply pneumatic press in two places, as illustrated in FIG. 3A.

Figure 5D:
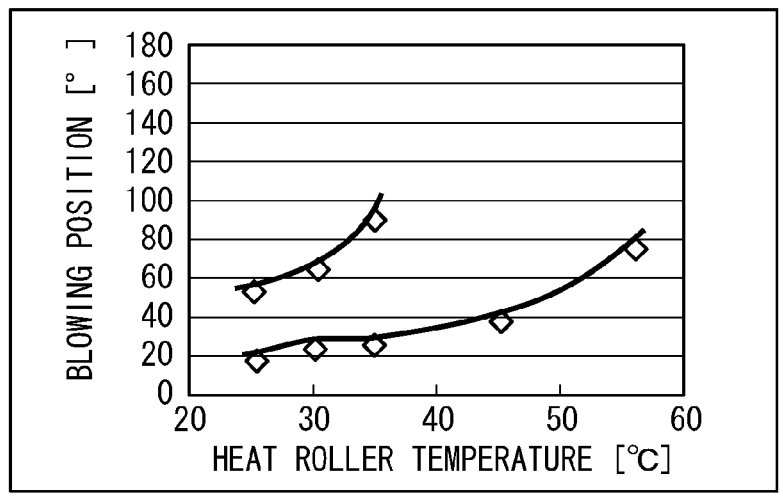

In FIG. 5D, the feed rate of the plastic film was set to 50 m/min, the roll diameter of the heat roller was set to φ300 mm, the temperature of the heat roller was set to 80° C., and the thickness of the plastic film was set to 80 μm. In addition, pneumatic press was applied so that the surface pressure (pneumatic-press pressure+tension) of the plastic film was 3.0 kPa. The film-surface temperature of the plastic film prior to contact with the heat roller was varied to determine the optimum position of pneumatic press. Note, however, that lowering the temperature of the heat roller resulted in the need to apply pneumatic press in two places, as in the case of FIG. 3C.

Figure 5E:
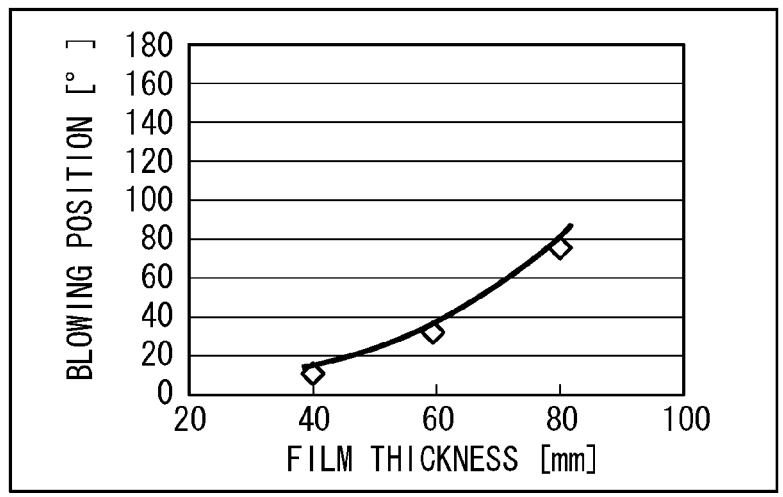

In FIG. 5E, the feed rate of the plastic film was set to 50 m/min, the roll diameter of the heat roller was set to φ300 mm, the temperature of the heat roller was set to 80° C., and the film-surface temperature of the plastic film prior to contact with the heat roller was set to 55° C. In addition, pneumatic press was applied so that the surface pressure (pneumatic-press pressure+tension) of the plastic film was 3.0 kPa. The thickness of the plastic film was varied to determine the optimum position of pneumatic press.

As can be understood from FIGS. 5A to 5E, by optimally determining the position of an air nozzle or nozzles from the feed rate of the plastic film, the roll diameter of the heat roller, the temperature of the heat roller, the film-surface temperature of the plastic film prior to contact with the heat roller, and the thickness of the plastic film, it is possible to optimally apply pneumatic press to a position where wrinkles begin to occur due to heating by the heat roller. Accordingly, the optimum position of pneumatic press by the air nozzle or nozzles is preferably determined from the feed rate of the plastic film, the roll diameter of the heat roller, the temperature of the heat roller, the film-surface temperature of the plastic film prior to contact with the heat roller, and the thickness of the plastic film.

In the present embodiment, the plastic film is preferably a cellulose acylate film having a thickness of 80 μm or less. The planarity problem of the plastic film is particularly significant in the case of a cellulose acylate film of 80 μm or less in thickness. In addition, clusters of wrinkles are liable to be developed by the heat roller. Accordingly, the presently disclosed subject matter is particularly effective for the cellulose acylate film.

In addition, in the present embodiment, the thickness of the coating layer is preferably 0.05 μm or larger but not larger than 25 μm. A thin film having a coating layer thickness of 0.05 μm or larger but not larger than 25 μm is susceptible to the planarity problem of a plastic film and the development of clusters of wrinkles due to heating by the heat roller. Accordingly, the presently disclosed subject matter is particularly effective for the thin film. The presently disclosed subject matter is also particularly effective when the coating layer is an antireflection layer, as in the present embodiment.

As another embodiment of the presently disclosed subject matter, the heat roller may be structured so that both side edges (knurls) of a film do not come into contact with surfaces of the heat roller. Specifically, surfaces immediately below the knurls are preferably concaved. The reason for this is that it is possible to prevent an expanded plastic film from failing to escape to the outside and, therefore, becoming wrinkled as the result of the knurls being caught on surfaces of the heat roller.

As yet another embodiment of the presently disclosed subject matter, the heat roller may be made crown-shaped. The reason for this is that a thermally expanded film is allowed to easily stretch outward across the width thereof.

As still another embodiment of the presently disclosed subject matter, it is more preferable to apply a friction-reducing treatment to surfaces or contact surfaces of the heat roller. By applying the friction-reducing surface treatment, the plastic film is allowed to expand crosswise (in the transverse direction) even if the film expands. Consequently, wrinkles are less likely to develop. Here, possible examples of the friction-reducing treatment include coating surfaces of the heat roller with a fluorine resin, a silicone resin, or the like.

As still another embodiment of the presently disclosed subject matter, at least one of rollers before and after the heat roller is preferably one of a concave roller and an expander roller. Alternatively, side edges of the plastic film are preferably pulled crosswise by using a tenter in at least one of positions in front and back of the heat roller. By applying the above-described construction in at least one of positions in front and back of the heat roller, the strength of pulling the plastic film can be increased. Consequently, wrinkles are less likely to develop in the plastic film.

As still another embodiment of the presently disclosed subject matter, grooves are preferably formed in surfaces of the heat roller. By releasing carrier air through the grooves and thereby suppressing the lift of the plastic film on the heat roller, it is possible to suppress wrinkles resulting from feeding. Thus, it is possible to restrain wrinkles due to the thermal expansion of the plastic film from being enhanced by the wrinkles resulting from feeding.

Here, experiments were conducted with regard to a construction according to the above-described embodiment of the presently disclosed subject matter and a construction not in accordance therewith. The experiments showed that in the presently disclosed subject matter, it was possible to improve the planarity of the plastic film and uniformly and precisely form a coating film. On the other hand, the experiments showed that in the absence of the construction of the presently disclosed subject matter, it was not possible to obtain the planarity of the plastic film and uniformly and precisely form the coating film.

Note that it is also preferable to manufacture a coating film by using a plurality of the above-described embodiments of the presently disclosed subject matter.

Figure 6A:
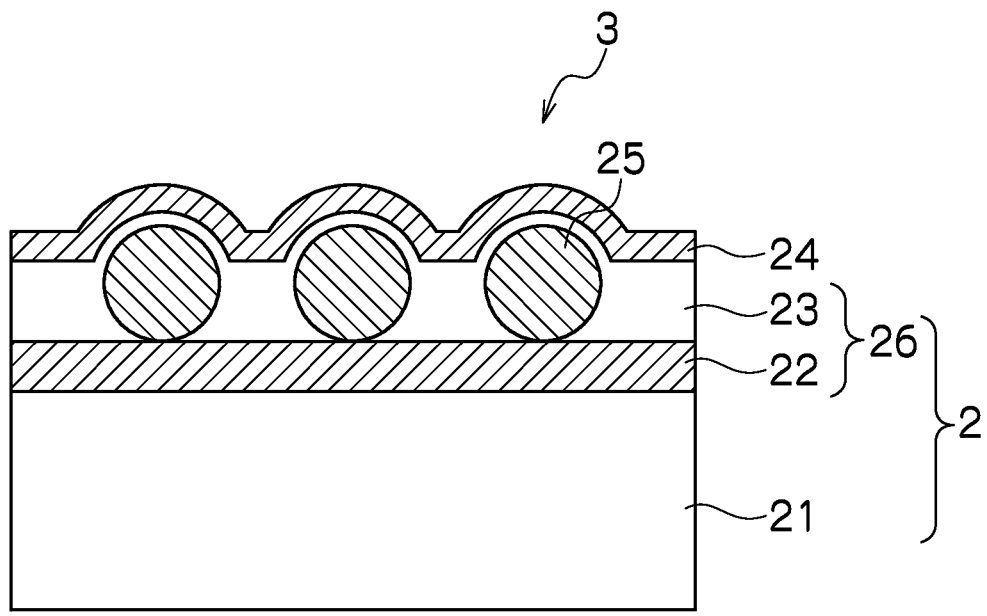
FIGS. 6A and 6B are cross-sectional views respectively illustrating one example of a coating film according to the presently disclosed subject matter.

Next, a description will be given of an antireflection film. A substrate (base film) 21 illustrated in FIG. 6A is transparent and is a member serving as a base for respective layers to be formed on and above. The substrate 21 is a plastic film composed of a polymer. Examples of the polymer include cellulosic ester, polyamide, polycarbonate, polyester, polystyrene, polyolefin, norbornene-based resin, and amorphous polyolefin. However, cellulose acylate is preferably used.

An optical functional layer 26 is a layer having such actions as an optical functional layer has. The optical functional layer 26 is composed of at least one layer made of a binder, a polymerization initiator, a dispersant, and the like, which are polymers. Accordingly, the optical functional layer 26 may have a multilayer structure composed of two or more layers. In the present embodiment, there is formed an optical functional layer 26 having a multilayer structure composed of a first layer 22 and a second layer 23. Examples of layers constituting the optical functional layer include, for example, an optical diffusion layer, a medium-refractive index layer, a high-refractive index layer, an optical compensation layer, and an antiglare property-imparting layer. In addition, layers constituting the optical functional layer 26 may be those of the same type or may be those having different compositions. A selection may be made, as appropriate, from among the abovementioned layers, to form a desired optical functional layer 26. Note, however, that the optical functional layer 26 preferably includes an antiglare property-imparting layer as a component layer, in order to obtain an excellent antireflection effect.

In addition, a binder used for the optical functional layer 26 is preferably a polymer having a saturated hydrocarbon chain or a polyether chain as the main chain thereof. By using a polymer serving as the binder, the polymer in which the structure of a monomer composing the polymer, the presence or absence of aromatic rings or the presence or absence of atoms, such as halogen atoms, sulfur atoms, phosphorous atoms or nitrogen atoms in the monomer are appropriately selected, it is possible to suitably adjust the refractive index of a layer to be formed.

A plurality of translucent fine particles 25 is added to the second layer 23. In the presently disclosed subject matter, a fine particle in which there is no absorption in the visible light region is referred to as a translucent fine particle. If a plurality of such translucent fine particles 25 as described above is added into a layer, it is possible to easily adjust the refractive index of the layer by the action of the fine particles. In addition, since the translucent fine particles allow light to pass therethrough, it is possible to suitably adjust the antiglare property of the layer. Translucent particles are specifically described in paragraph [0044] of Japanese Patent Application Laid-Open No. 2003-302506, and can be applied to the presently disclosed subject matter. Note that translucent fine particles are preferably selected as appropriate, according to the refractive index of a layer to be formed, while taking into consideration a difference in refractive index.

By taking into consideration differences in refractive index and particle diameter and selectively using translucent fine particles, it is possible to control characteristics of a layer to be formed. For example, if translucent fine particles having a large particle diameter are used, the antiglare property of a layer can be easily adjusted. If translucent fine particles having a relatively small particle diameter are used, the refractive index of a layer can be easily adjusted. Accordingly, it is preferable to concomitantly use two or more types of translucent fine particles different in kind and size. Consequently, even if, for example, film-surface irregularities which may deteriorate brightness uniformity and therefore problematic are present, it is possible to remedy the abovementioned problem by using translucent fine particles while selecting the particle diameter thereof.

The refractive index of the optical functional layer 26 is preferably set to 1.58 or higher but not higher than 2.0 by, for example, selecting and using translucent fine particle as appropriate, as described above. In addition, the refractive index of a low-refractive index layer 24 is preferably 1.31 or higher but not higher than 1.45. Such an optical functional layer 26 as described above has an excellent antiglare property. In addition, such a low-refractive index layer 24 has a high degree of hardness and has the feature that a surface of the layer is less likely to become scratched and so on. Accordingly, an antireflection film 3 composed of such layers as described above is an optical film superior in antiglare property, abrasion resistance, stainproofness, and the like. Note that translucent fine particles are preferably contained in one of the optical functional layer 26 and the low-refractive index layer 24. In addition, if the optical functional layer 26 or the like is composed of a plurality of layers as in the present embodiment, the translucent fine particles may be contained at least one of these layers.

The translucent fine particles are preferably made of at least one type of oxide of a metal selected from the group consisting of titanium, zirconium, aluminum, indium, zinc, tin and antimony. In addition, the average particle diameter of the particles is preferably 0.2 µm or smaller, more preferably 0.1 µm or smaller, and particularly preferably 0.06 µm or smaller. Examples of the abovementioned metal oxide include, for example, $TiO_2$, $ZrO_2$, $Al_2O_3$, $In_2O_3$, ZnO, $SnO_2$, $Sb_2O_3$, ITO (Indium Tin Oxide), and $SiO_2$. Of these metal oxides, $TiO_2$ and $ZrO_2$ are preferred in that a layer is made high in refractive index. Note that treating a surface of each fine particle with a silane coupling agent, a titanium coupling agent, or the like can improve dispersibility and compatibility with respect to a binder and is, therefore, preferable. The additive amount of the abovementioned fine particles with respect to the total mass of a layer to which the particles are added is preferably 10 to 90%, more preferably 20 to 80%, and particularly preferably 30 to 75%.

Of translucent fine particles, a mat particle larger in particle diameter than a filler particle and approximately 1 to 10 µm in average particle diameter can be preferably used as a fine particle used for the purpose of imparting an antiglare property. Examples of the mat particle include, for example, a silica particle, an inorganic compound particle, such as a $TiO_2$ particle, and an organic compound particle, such as an acrylic particle, a cross-linking acrylic particle, a polystyrene particle, a cross-linking styrene particle, a melamine particle, and a benzoguanamine particle. Of these particles, use of the cross-linking styrene particle, the cross-linking acrylic particle and the silica particle is preferred for the particles' capability to develop a high antiglare property. The shape of the mat particle is optional, regardless of whether spherical or indeterminate, and is not limited in particular. It is also possible to concomitantly use two or more types of mat particles different in particle diameter and/or shape. Note that in order to form a layer having an antiglare property, the contained amount of mat particles is preferably 10 to 2000 mg per 1 $m^2$ of a layer to be formed. More preferably, the contained amount is 100 to 1400 mg.

It is preferable that the abovementioned mat particles are uniformly dispersed within the layer. It is also preferable that the diameters of respective particles are substantially the same. For example, assume that particles the diameter of which is larger by 20% or more than the average particle diameter are coarse particles. Then, the ratio of coarse particles contained in all particles is preferably 1% or lower, and more preferably 0.1% or lower. Accordingly, it is preferable to use mat particles having been subjected to as high a degree of sorting as possible for the purpose of making the mat particles substantially the same in particle diameter and dispersing the particles uniformly within a layer. Note that the fine particles mentioned above are sufficiently smaller in particle diameter than wavelengths of light and, therefore, the scattering of light does not occur.

In addition, at least one of a fluorine-based compound or a silicone-based compound having a surface-activating action is preferably contained in the optical functional layer. By selecting and using, as appropriate, such compounds as described above, it is possible to form an optical functional layer having excellent stainproofness and lubricity. Note that the ratio of the abovementioned compounds with respect to the total solid content of a layer-forming material used for layer formation is preferably 0.01 to 20 mass %. More preferably, the ratio is 0.05 to 10 mass %, and particularly preferably 0.1 to 5 mass %.

A description will be given of the low-refractive index layer 24 formed on the above-described base film 2. The low-refractive index layer is preferably a hardened film formed by coating, drying and hardening a curable composition containing at least one monomer having two or more crosslinkable reactive groups. In addition, this monomer having two or more crosslinkable reactive groups is preferably an aldehyde compound containing two or more aldehyde groups.

Figure 6B:
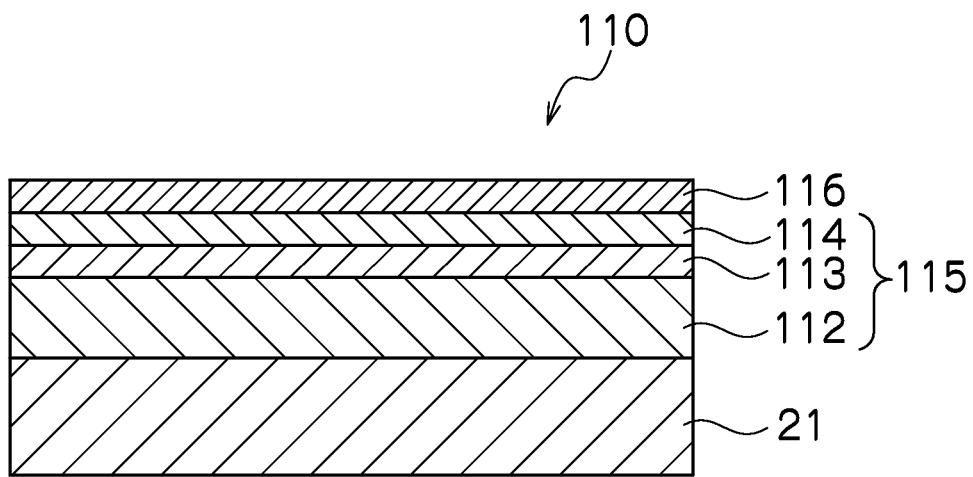

FIG. 6B illustrates one example of another form of an antireflection film which can be formed by the coating film manufacturing apparatus 1. As illustrated in FIG. 6B, an antireflection film 110 is composed of a substrate (base film) 21, an optical functional layer 115 and a low-refractive index layer 116. Note that the substrate 21 is the same as that described by referring to FIG. 6A and is, therefore, designated by the same reference numeral. The optical functional layer 115 has a multilayer structure in which a first layer 112, a second layer 113 and a third layer 114 are laminated in the order of nearest to farthest from the substrate 21. Here, it is possible to obtain the antireflection film 110 extremely superior in antireflection property by selecting the types of fine particle and binder as appropriate, forming a layer serving as a hard coat layer as the first layer 112, forming a medium-refractive index layer as the second layer 113, and forming a high-refractive index layer as the third layer 114.

Note that although a heretofore known method commonly used as a microgravure coating method is used as a coating method in the present embodiment, the present embodiment is not limited to this method. Examples of coating methods which can be suitably used for the presently disclosed subject matter include, for example, a dip coating method, an air knife coating method, a curtain coating method, a roller coating method, a wire bar coating method, a microgravure coating method, and an extrusion coating method (described in, for example, U.S. Pat. No. 2,681,294). Of the abovementioned coating methods, it is preferable to use the wire bar coating method, the extrusion coating method or the microgravure coating method, in order to form a coating layer having a uniform thickness and little coating unevenness. It is particularly preferable to use the microgravure coating method.

In the present embodiment, a mode for irradiating ultraviolet rays has been mentioned when ionizing radiation is applied to a heat-hardened low-refractive index layer. Alternatively, electron beam irradiation which is ionizing radiation may be applied, for example, in place of ultraviolet irradiation. Still alternatively, it is possible to concomitantly use these irradiations. When a plurality of ionizing radiations is concomitantly used as described above, desired irradiation apparatuses, such as an ultraviolet irradiation apparatus and an electron beam irradiation apparatus, may be prepared and used by disposing these apparatuses in parallel. Then, ultraviolet rays and electron beams may be continuously irradiated to the low-refractive index layer. Note that the installation locations of the respective irradiation apparatuses and the order of the positions thereof are not limited in particular, but can be selected as appropriate.

Note that as the ultraviolet irradiation apparatus, it is possible to suitably use a heretofore-known ultraviolet irradiation apparatus, such as a high-pressure mercury lamp, a xenon lamp, a metal halide lamp, or a fusion lamp. In addition, an apparatus for ionizing radiation is not limited in particular either. It is possible to use an apparatus, among various types of apparatuses heretofore known as ionizing radiation apparatuses. Note, however, that if ultraviolet rays are used for the purpose of fully facilitating hardening while reducing damage to a base film when applying ionizing radiation, the irradiance level of the irradiation is preferably set to 30 mJ or higher but not higher than 800 mJ. More preferably, the irradiance level is 50 mJ or higher but not higher than 300 mJ. If ionizing radiation is used, an accelerating electron pressure is preferably set to 80 kV or higher but not higher than 300 kV.

Note that details on curable resins, fine particles, additive agents, such as a polymerization initiator and a dispersant, methods for forming respective layers, and the like, used to form a substrate, an optical functional layer and a low-refractive index layer according to the presently disclosed subject matter are described in paragraph [0061] of Japanese Patent Application Laid-Open No. 2005-257786. Accordingly, this description can also be applied to the presently disclosed subject matter.

An antireflection film available by the presently disclosed subject matter can be suitably used as a protective film for a polarizing plate. The polarizing plate is composed primarily of two protective films by which a polarizing layer is sandwiched. The antireflection film is preferably used for at least one of these protective films. At this time, the antireflection film serves also as the protective film. Thus, it is possible to reduce the manufacturing cost of the polarizing plate. In addition, use of the antireflection film as an outermost surface layer prevents reflection of extraneous light. Thus, it is possible to obtain a polarizing plate also superior in scratch resistance, stainproofness, and the like. Alternatively, one of the two protective films is preferably an antireflection film and the other protective film is preferably an optical compensation film including an optical anisotropic layer. Such an optical compensation film as described above can be obtained by forming an optical functional layer including an optically anisotropic layer. The optical compensation film is also referred to as a phase difference film and can improve the view angle characteristics of a liquid crystal display screen.

By using the antireflection film available by the presently disclosed subject matter as a protective film for a polarizing layer, as described above, it is possible to suitably apply the antireflection film to a transmissive, reflective or semi-transmissive liquid crystal display device of such a mode as TN (Twisted Nematic), STN (Super-Twisted Nematic), VA (Virtical Alignment), IPS (In Plane Switching), OCB (Optically Compensated Bend), or the like.

As the polarizing layer, a heretofore-known polarizing layer or a polarizing layer cut out from a lengthy polarizing layer the absorption axis of which is neither parallel nor vertical in the longitudinal direction thereof may be used.

Thus, the polarizing layer is not limited in particular. The latter polarizing layer is formed by applying a tensile force to the transverse direction of a continuously supplied polymer film and thereby stretching the film, while holding both side edges of the film by holding devices. Note that the film is stretched at least in the transverse direction at a ratio of 1.1 to 20, so that the difference of a traveling speed at the holding devices at both side edges of the film with respect to a traveling speed in the longitudinal direction of the film is 3% or smaller. Then, the traveling direction of the film is bent with both side edges thereof held, so that an angle formed by the traveling direction of the film and the substantial stretching direction of the film at the end of this film holding step is 20° to 70°. Consequently, it is possible to fabricate a polarizing layer to which desired stretch has been applied. Note that setting the abovementioned angle to 45° is preferable from the viewpoint of productivity.

The antireflection film available by the presently disclosed subject matter is preferably used for a display unit, such as an LCD, a PDP, an ELD or a CRT. In addition, if such an antireflection film including a transparent substrate as is obtained by the presently disclosed subject matter is used with the transparent substrate side thereof bonded to the image display surface of a display unit, it is possible to provide a display unit superior in display quality.

What is claimed is:

1. A method for manufacturing a coating film, comprising:
   winding off a plastic film wound into a roll form to run;
   conveying the plastic film while winding the plastic film around a heat roller;
   pneumatically pressing by air jetted from an air nozzle in a position where wrinkles begin to form in the plastic film due to heating by the heat roller at a pressure equal to or higher than a pressure at which wrinkles disappear in the position where the wrinkles begin to form in the plastic film due to heating by the heat roller; and
   applying a coating liquid onto the plastic film after the pneumatic press.

2. The method for manufacturing a coating film according to claim 1, wherein the position of pneumatic pressing by the air nozzle is optimally determined from a conveyance rate of the plastic film, a roll diameter of the heat roller, a temperature of the heat roller, a film-surface temperature of the plastic film prior to contact with the heat roller, and a thickness of the plastic film.

3. The method for manufacturing a coating film according to claim 1, wherein the heat roller is structured so that both side edges of the plastic film do not come into contact with surfaces of the heat roller.

4. The method for manufacturing a coating film according to claim 1, wherein surfaces of the heat roller immediately below both side edges of the plastic film are concave.

5. The method for manufacturing a coating film according to claim 1, further comprising applying a friction-reducing treatment to a surface of the heat roller or contact surfaces of both side edges of the plastic film.

6. The method for manufacturing a coating film according to claim 1, further comprising at least one of a roller before and after the heat roller that is one of a concave roller and an expander roller.

7. The method for manufacturing a coating film according to claim 1, wherein side edges of the plastic film is pulled crosswise by using a tenter in at least one of positions in front and back of the heat roller.

8. The method for manufacturing a coating film according to claim 1, wherein grooves are formed in surfaces of the heat roller.

9. The method for manufacturing a coating film according to claim 1, wherein the plastic film is a cellulose acylate film whose thickness is 80 .mu.m or less.

10. The method for manufacturing a coating film according to claim 1, wherein the heat roller is a crown roller.

11. A method for manufacturing a coating film, comprising:
    winding off a plastic film wound into a roll form to run;
    conveying the plastic film while winding the plastic film around a heat roller;
    pneumatically pressing by air jetted from an air nozzle at a pressure equal to or higher than a pressure at which wrinkles disappear in a position where the wrinkles begin to form in the plastic film due to heating by the heat roller; and
    applying a coating liquid onto the plastic film after the pneumatic press, wherein
    the position of pneumatic pressing by the air nozzle is determined from a conveyance rate of the plastic film, a roll diameter of the heat roller, a temperature of the heat roller, a film-surface temperature of the plastic film prior to contact with the heat roller, and a thickness of the plastic film.

12. A method for manufacturing a coating film, comprising:
    winding off a plastic film wound into a roll form to run;
    conveying the plastic film while winding the plastic film around a heat roller;
    pneumatically pressing by air jetted from an air nozzle at a pressure equal to or higher than a pressure at which wrinkles disappear in a position where the wrinkles begin to form in the plastic film due to heating by the heat roller; and
    applying a coating liquid onto the plastic film after the pneumatic press, wherein
    the heat roller is structured so that both side edges of the plastic film do not come into contact with surfaces of the heat roller.

* * * * *